(12) United States Patent  (10) Patent No.: US 9,405,446 B1
Haitani et al.                (45) Date of Patent:    Aug. 2, 2016

(54) EFFICIENT AND INTERACTIVE PRESENTATION OF ITEM IMAGES

(71) Applicant: Amazon Technologies, Inc., Reno, NV (US)

(72) Inventors: Robert Yuji Haitani, Seattle, WA (US); Charles Shearer Dorner, Seattle, WA (US)

(73) Assignee: Amazon Technologies, Inc., Seattel, WA (US)

( * ) Notice: Subject to any disclaimer, the term of this patent is extended or adjusted under 35 U.S.C. 154(b) by 204 days.

(21) Appl. No.: 14/223,960

(22) Filed: Mar. 24, 2014

(51) Int. Cl.
 *G06F 13/00* (2006.01)
 *G06F 15/00* (2006.01)
 *G06F 3/0484* (2013.01)
 *G06T 3/40* (2006.01)

(52) U.S. Cl.
 CPC .............. *G06F 3/04842* (2013.01); *G06T 3/40* (2013.01)

(58) Field of Classification Search
 CPC .......................... G06T 11/60; G06F 21/6218
 USPC .......................... 715/761–765, 851–853, 767
 See application file for complete search history.

(56) References Cited

U.S. PATENT DOCUMENTS

| 7,657,457 | B2 | 2/2010 | Razumov |
| 8,549,407 | B2 | 10/2013 | O'Neil Garcia |
| 8,751,966 | B2 | 6/2014 | Weir |
| 8,866,841 | B1* | 10/2014 | Distler .................... G06T 11/60 345/619 |
| 2014/0056540 | A1* | 2/2014 | Hamburg ............ G06F 21/6218 382/299 |
| 2014/0344115 | A1 | 11/2014 | Yatsuda et al. |

OTHER PUBLICATIONS

NY Times—Front Row to Fashion Week, NYTimes.com, http://www.nytimes.com/newsgraphics/2013/09/13/fashion-week-editors-picks/, screen captured on Feb. 18, 2014, in 1 page.
NY Times—Front Row to Fashion Week, NYTimes.com, http://www.nytimes.com/newsgraphics/2013/09/13/fashion-week-editors-picks/, retrieved on Feb. 18, 2014 in 4 pages.
liteAccordion—a horizontal accordion plugin for jQuery, http://nicolahibbert.com/demo/liteAccordion/, retrieved on Feb. 18, 2014, in 6 pages.

\* cited by examiner

*Primary Examiner* — Kevin Nguyen
(74) *Attorney, Agent, or Firm* — Knobbe, Martens, Olson & Bear, LLP

(57) ABSTRACT

Systems and methods are provided for generating and updating an efficient configuration for display of item images, in order to present the contents of a collection of item images to a user in a space-efficient and visually pleasing manner. For example, an initial configuration can be generated including thin slices of each image. The thin slices can be symmetrically cropped versions of the corresponding image designed to still convey a high degree of detail about the depicted item. When a user interacts with the thin slices, for example, by hovering a cursor or through a touch event, the initial configuration can be updated to gradually expand slices and contract full size images based on the user input.

26 Claims, 10 Drawing Sheets

EFFICIENT AND INTERACTIVE PRESENTATION OF ITEM IMAGES

BACKGROUND

Digital imaging has become increasingly popular for representing or accompanying digital information, especially in network services such as those offered by digital goods providers, electronic catalog services, social networking services, and visual bookmarking services. For example, an electronic catalog service may provide data and code for displaying pages describing items, such as products or services, which are available from the electronic catalog service. The items may be depicted visually on the display page by a digital image or images. Further, the electronic catalog service may provide multiple images (each of a different item) for display on a single page or user interface, such as in a search or browse interface, from which a user may select an item of interest to view additional item information associated with the item.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
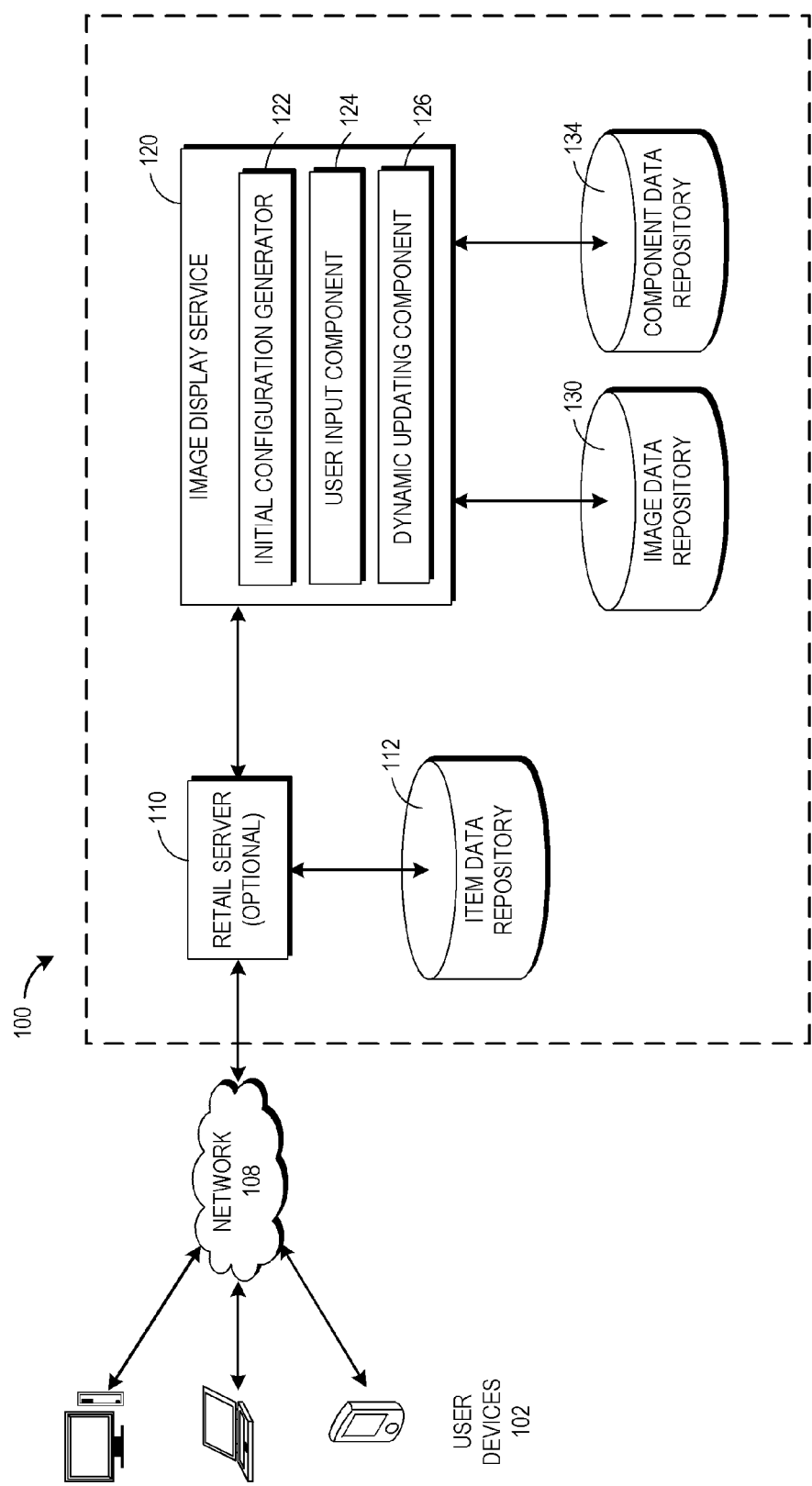
FIG. 1A is a block diagram depicting an illustrative operating environment for presenting users with efficient display of images of items.

Due to the ever-increasing amount of information available to users of electronic catalog services and other network services, there is an ongoing need to implement user-friendly mechanisms to dynamically manage organization and presentation of digital information, for example, items represented by digital images within an electronic catalog or data store. Such images are often presented together in a user interface illustrating multiple items, for example, collections of items returned in response to a search or browse request of an electronic catalog, or items grouped together in a collection based on category, context, content, or other factors. However, such collections may contain large quantities of items, and therefore the images of all items in the collection may not be presented together in a user interface having a limited area for displaying images. Further, the item images may be of various types and dimensions, and as a consequence may not be easily presented as a group in an organized presentation. Users may also wish to interact with the images to view more information about corresponding items. Therefore, a need exists to visually convey the contents of a collection, or subset of a collection, of items in an efficient and interactive manner.

Generally described, aspects of the present disclosure relate to generating an initial configuration of a plurality of efficiently cropped and organized interactive image slices and updating the initial configuration in response to user interaction with an interactive image slice. For example, according to some embodiments, when a user interface or page is generated, as described herein, content may be selected to present in the user interface. The content may include interactive, selectable item images, such as item thumbnails, that are associated with a corresponding item. Each of a number of item images can be cropped from its full size from two opposite sides towards the image center in order to present a relatively thin, interactive slice of the image that still conveys information about the contents of the full sized image. A user interaction with the interactive slice may result in a dynamic update to the initial configuration. The dynamic update may be based on an indication of user input (for example, a specific movement of, and/or location of, a user's cursor or other input control within the user interface) or based on a touch gesture, in some embodiments. As an example, a dynamic update to the initial configuration can be triggered when an indication is received that at least one interactive slice is selected, hovered over, or otherwise interacted with by a user viewing the user interface.

As used herein, a "slice" of an image can refer to any reduced representation of the image generated by cropping and/or scaling image data from at least one side of the image. In some embodiments, a reduced representation can be produced by both cropping image data from at least one side of the image as well as scaling the cropped image. A slice center point (which, in the case of a vertical slice, may refer to the horizontal center point of the reduced representation of the image) can correspond to a center point of the image, a center point of an item or object depicted in the image, or any other point in the image. A slice can therefore be centered relative to the image in some embodiments, relative to the item in some embodiments, or off-center relative to the image and item, in some embodiments. In some embodiments, a slice center point for each image may be determined based on an analysis of image data and/or one or more rules. In other embodiments, metadata may be associated with an image file identifying a slice center point to be used in generating a reduced representation of the image.

As used herein, the term "crop" can refer to any way of reducing the amount of an image that is presented for display or otherwise viewable to a user at a given time. In some embodiments, "crop" can refer to removal of outer portions of an image from one or more sides. The size of the image can accordingly be reduced by removal of outer portions of image data. In other embodiments, "crop" can refer to masking outer portions of an image behind a masking layer and displaying some or all of the image through a viewport or window. A window, such as a rectangular bounding box, can be arranged over the image in the masking layer foreground of the image. Gradually expanding the window can reveal incrementally more of an outer portion of the image until the entire image is displayed, while gradually contracting the window can mask incrementally more of the outer portion of the image to display a slice of the image. Accordingly, the non-displayed image data may not be removed from the image, but rather masked behind a foreground masking layer, which may include one or more masking objects.

During dynamic update to the initial configuration, the interactive slice that has been selected or otherwise indicated to be of interest may be gradually expanded from two opposing edges to display the corresponding full width image (or a substantial portion of the corresponding full width image), as disclosed herein. The dynamic update to the initial configuration may, depending on the embodiment, gradually contract at least one adjacent image previously displayed at full or substantially full width to instead display the corresponding slice. In some embodiments, interactive image slices located further than a set distance from the expanding slice may remain unaltered by the user input in order to preserve a substantially static initial configuration. One advantage of such an approach is that too much movement within the initial configuration can be visually overwhelming to a user, making it more difficult for the user to effectively select desired slices in the user interface for expansion. To illustrate, according to one embodiment, a plurality of tall, thin interactive slices can be arranged in an initial configuration displaying the interactive slices side by side. As the user hovers a cursor over a first interactive slice in the initial configuration, the first interactive slice can gradually expand horizontally, from the left and right edges away from the image center, until the corresponding full sized image is presented. As the user moves the cursor to the right to hover over an adjacent slice, the full sized image corresponding to the first interactive slice can be gradually contracted horizontally, from the left and right edges toward the center, until the first interactive slice is presented in place of the previously presented full sized image. While the contraction toward the first interactive slice is occurring, the adjacent slice can gradually expand horizontally, from the left and right edges away from the image center, until the corresponding full sized image is presented. During expansion and contraction of images near the user's cursor, the initial configuration beyond a predetermined distance can remain unchanged. For example, in one embodiment, a current interactive slice over which the cursor hovers can be expanded, and one adjacent slice can be contracted. In another embodiment, the current interactive slice can be expanded and two adjacent slices can be contracted. The dynamic update may additionally or alternatively rotate through a carousel of image slices based on the user input, as further described below.

According to some embodiments, an image display service, as described herein, may enable a user to select one or more items from the initial configuration of interactive slices and lock these images in a presentation of the corresponding full (or substantially full) sized item image. In one embodiment, the user can select an option to lock the image in the full sized presentation in place in the initial configuration. In another embodiment, a separate area of the user interface can be populated with such locked full sized images. This may enable a user to visually bookmark favorite items from a collection, for example, which will remain full sized while the user continues to browse or scroll through other interactive slices.

It will be appreciated that a full sized image as discussed herein can refer to an image actually displayed at full size, but could also refer to a full sized image that has been scaled according to display needs (such as for presentation on a mobile device screen), or which has been slightly cropped to fit in a window (such as to provide uniform dimensions/sizes for the images in a collection, among other reasons). A full sized image as described herein refers to an image that shows the full details of the pictured item, in contrast to the corresponding image slices, which present a narrow and abridged view of the pictured item or product. However, the image slices still allow a user to assess, from the abridged item view in the image slice, many characteristics of the item. In some embodiments, an image display service, as described herein, may determine a slice size and a "full sized" image size for purposes of a given collection of item images, where each of these sizes may be smaller than the actual stored images of the collection. In such embodiments, the image display service may crop and/or scale stored item images even when presenting the images as "full sized" images in a display configuration, with the difference between a slice and a full sized image being that the slice version of each item image is smaller in horizontal and/or vertical dimension than the corresponding "full sized" version of that image.

For example, embodiments for efficient and interactive item image presentation described herein may be particularly well suited for presenting images from certain types of item collections. In one embodiment, an interactive image presentation described herein may be used for displaying thumbnail images of collections of dresses. Each thumbnail can be cropped as described into a thin, vertical slice having a thinner width than the full sized thumbnail, yet still contain a large amount of information about the dress pictured. For example, a thin vertical slice of a dress image still contains information about the dress color, pattern, neckline, hem length, and waist features such as belts or color accents, among other characteristics. Although embodiments discussed herein are often described with respect to vertical slices of dress images, this is for illustrative purposes and is not meant to limit the scope of the presentation techniques described herein, which can be used to accommodate other types of images as well. For example, images of coats, textiles, books, drapes, and lamps, to name a few, could also benefit from the efficient and interactive displays discussed herein. Further, item images are not limited to horizontal cropping into tall, thin, vertical slices, as it will be appreciated that vertically cropping an image into a long, thin, horizontal slice can provide similar efficient display advantages and may provide a user with more information regarding certain types of items than a vertical image slice would provide. In addition, although the slices are typically discussed herein as being generated by cropping the full sized image, in other embodiments, a slice can be a version of the full sized image that has been scaled or compressed in one or more directions. For example, a vertical slice of an image, in one embodiment, may be generated at least in part by horizontally scaling the image to have a smaller width than the full sized image.

In some embodiments, an electronic catalog system, as described herein, may include or be in communication with a data store of information about items that may be listed for sale, lease, etc. by sellers, merchants and/or other users. The item information in this data store may be viewable by end users through a browsable or searchable electronic catalog in which each item may be described in association with a network page describing the item (a.k.a., an item detail page). Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree and/or using various other navigation techniques. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

While a retail environment is often used as an example below, it will be appreciated that interactive image displays, as disclosed herein, may be used in a variety of environments other than a retail environment. For example, aspects of the present disclosure, in some embodiments, may be used or implemented to efficiently display images within any user interface, page, video, electronic book and/or other electronic content. Without limitation, aspects of the present disclosure may be used for efficient image display in social networking contexts, digital photo albums, digital news articles, and/or visual bookmarking contexts. For illustrative purposes, item images and interactive slices are often described below in the context of items listed in an electronic catalog. Alternatively, in other embodiments, item images and interactive slices that may be presented according to the systems and methods described herein may include advertisements, images in news articles, editorial content, videos, classified listings, auction listings and/or any other content that may be electronically presented to a user.

The illustrative operating environment shown in FIG. 1A includes an electronic marketplace system 100 that enables users to browse and place orders for items (such as items listed in an electronic catalog). The marketplace system 100 may include one or more image display services 120 that include an initial configuration generator 122, a user input component 124, and a dynamic updating component 126 stored in memory therein that may be used to implement various aspects of the present disclosure, such as generating an initial configuration for efficient display of images, analyzing user input with respect to the initial configuration, dynamically updating the initial configuration based on the user input, and other aspects discussed herein. The marketplace system 100 may also include one or more retail servers 110 that facilitate electronic browsing and purchasing of items, such as goods and/or services, using various user devices, such as user computing devices 102. Those skilled in the art will recognize that the user computing devices 102 may be any of a number of computing devices that are capable of communicating over a network including, but not limited to, a laptop, personal computer, personal digital assistant (PDA), hybrid PDA/mobile phone, mobile phone, electronic book reader, digital media player, tablet computer, gaming console or controller, kiosk, augmented reality device, other wireless device, set-top or other television box, and the like.

The image display service 120, which will be described below in more detail, may be connected to or in communication with a component data repository 134 that may include a number of components, where a "component" may be a code module or service implemented by a computing device including hardware, such as one or more processors, and capable of producing content that may be placed in a portion of a user interface or displayable file. For example, a component selected for inclusion in a portion of a page, displayable file or user interface, may dynamically generate content that contains links, buttons or other controls for allowing users to perform specific actions, such as adding a displayed item to a shopping cart. The retail server 110 may be connected to or in communication with an item data repository 112 that stores item information regarding a number of items, such as items listed in an electronic catalog as available for browse, and/or purchase via the retail server 110. Item data stored in item data store 112 may include any information related to each item. For example, item data may include, but is not limited to, price, availability, title, item identifier, item images, item description, item attributes, keywords associated with the item, etc. In some embodiments, the item data store 112 may store digital content items (e.g., audiobooks, electronic books, music, movies, multimedia works, etc.). The retail server 110 may also be connected to or in communication with a user data store (not illustrated) that stores user data associated with users of retail server 110, such as account information, purchase history, browsing history, item reviews and ratings, personal information, user preferences, location information, etc. The image display service 120 may be connected to or in communication with an image data repository 130 that may be used to store a primary image associated with each of the number of items that can be displayed to represent the item in a collection, for example, a collection of search results, browse results, a user-generated collection, or any other collection. For example, multiple images can be associated with an item, for instance to aid a user in a purchase decision regarding the item. One of the images can be selected as a primary image that will be used to visually represent the item in certain contexts, such as when the item is displayed in a collection with other items.

In different embodiments, each of item data repository 112, image data repository 130 and/or component data repository 134 may be local to image display service 120, may be local to retail server 110, may be remote from both image display service 120 and retail server 110, and/or may be a network-based service itself. The item data repository 112, image data repository 130 and/or component data repository 134 may be embodied in hard disk drives, solid state memories, any other type of non-transitory computer-readable storage medium, and/or a file, a database, a relational database, stored in any such non-transitory computer-readable medium accessible to the retail server 110. The item data repository 112, image data repository 130 and/or component data repository 134 may also be distributed or partitioned across multiple local and/or storage devices without departing from the spirit and scope of the present disclosure. In the environment shown in FIG. 1, a user of the marketplace system 100 may utilize a user computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. In addition, the network 108 may be a personal area network, local area network, wide area network, over-the-air broadcast network (e.g., for radio or television), cable network, satellite network, cellular telephone network, or combination thereof. For example, the network 108 may be a publicly accessible network of linked networks, possibly operated by various distinct parties, such as the Internet. In some embodiments, the network 108 may be a private or semi-private network, such as a corporate or university intranet. The network 108 may include one or more wireless networks, such as a Global System for Mobile Communications (GSM) network, a Code Division Multiple Access (CDMA) network, a Long Term Evolution (LTE)

network, or some other type of wireless network. The network 108 can use protocols and components for communicating via the Internet or any of the other aforementioned types of networks. Protocols and components for communicating via the Internet or any of the other aforementioned types of communication networks are well known to those skilled in the art and, thus, are not described in more detail herein.

The marketplace system 100 is depicted in FIG. 1A as operating in a distributed computing environment including several computer systems that are interconnected using one or more computer networks. The marketplace system 100 could also operate within a computing environment having a fewer or greater number of devices than are illustrated in FIG. 1A. Thus, the depiction of marketplace system 100 in FIG. 1A should be taken as illustrative and not limiting to the present disclosure. For example, the marketplace system 100 could implement various Web services components and/or peer-to-peer network configurations to implement at least a portion of the processes described herein.

In brief, the retail server 110 is generally responsible for providing front-end communication with various user devices, such as a user computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services from one or more data stores, such as item data repository 112, as is done in conventional electronic commerce systems. In certain embodiments, the retail server 110 may also access item data from other data sources, either internal or external to marketplace system 100. While marketplace system 100 is often described herein with respect to an embodiment in which the image display service 120 communicates with a retail server 110 in a retail environment, in other embodiments, an image display service 120 may operate independently of a retail environment. In some such embodiments, the image display service 120 may communicate with a user computing device 102 without the presence of a retail server, or may communicate with another server responsible for providing front-end communication with the computing device 102. In other embodiments, the retail server 110 may include or implement an image display service, as described herein, such that a separate image display service 120 may not be present in certain embodiments.

Figure 1B:
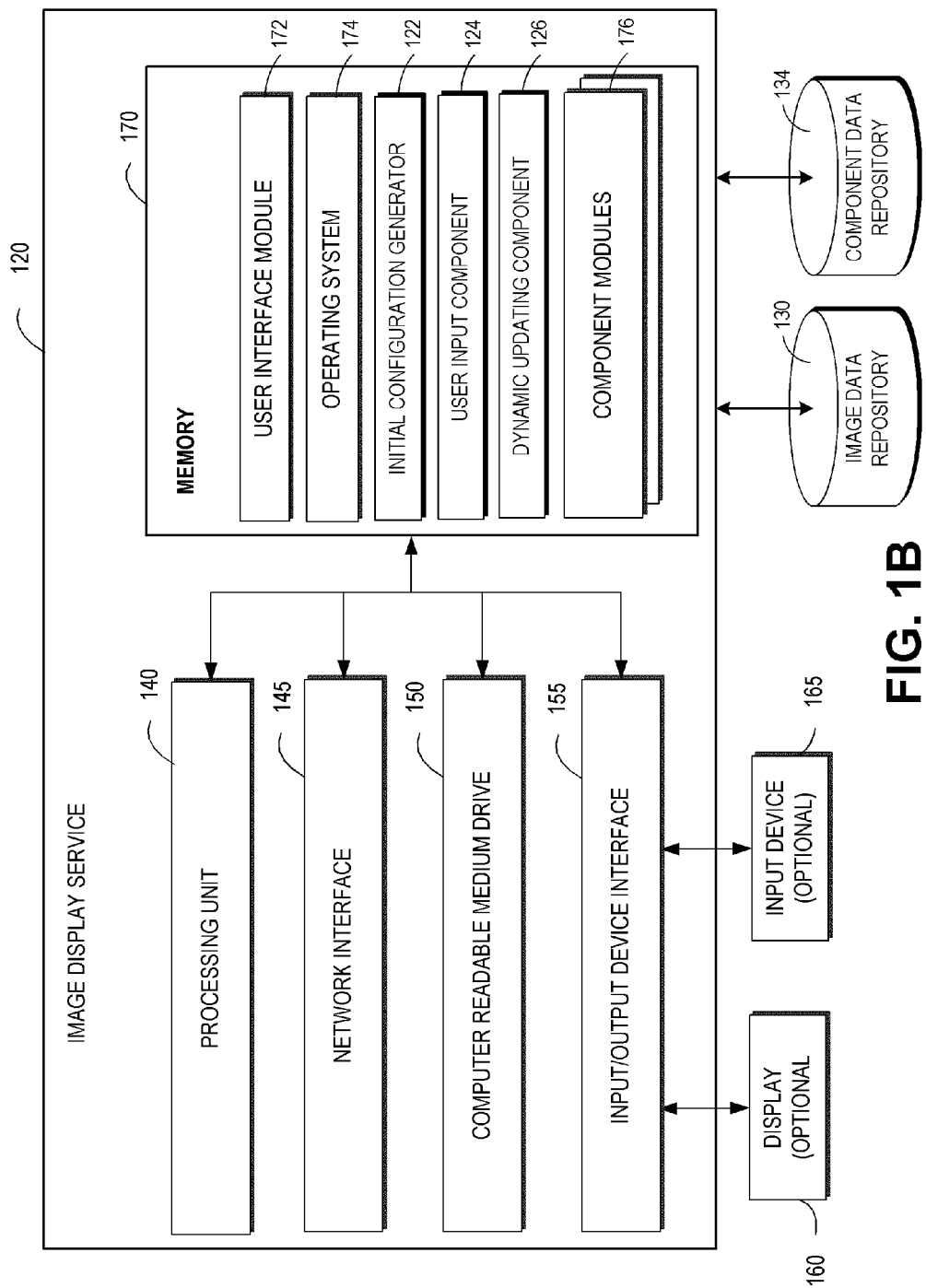
FIG. 1B depicts a general architecture of a computing device providing an image display service for efficient and interactive display of images of items.

FIG. 1B depicts a general architecture of a computing system (referenced as image display service 120) that generates an initial configuration for efficient image display and updates at least a portion of the initial configuration based on user interaction with the initial configuration. The general architecture of the image display service 120 depicted in FIG. 1B includes an arrangement of computer hardware and software components that may be used to implement aspects of the present disclosure. The image display service 120 may include many more (or fewer) elements than those shown in FIG. 1B. It is not necessary, however, that all of these generally conventional elements be shown in order to provide an enabling disclosure. As illustrated, the image display service 120 includes a processing unit 140, a network interface 145, a computer readable medium drive 150, an input/output device interface 155, a display 160, and an input device 165, all of which may communicate with one another by way of a communication bus. The network interface 145 may provide connectivity to one or more networks or computing systems. The processing unit 140 may thus receive information and instructions from other computing systems or services via the network 108. The processing unit 140 may also communicate to and from memory 170 and further provide output information for an optional display 160 via the input/output device interface 155. The input/output device interface 155 may also accept input from the optional input device 165, such as a keyboard, mouse, digital pen, microphone, touch screen, gesture recognition system, voice recognition system, etc.

The memory 170 may contain computer program instructions (grouped as modules in some embodiments) that the processing unit 140 executes in order to implement one or more embodiments. The memory 170 generally includes RAM, ROM and/or other persistent, auxiliary or non-transitory computer-readable media. The memory 170 may store an operating system 174 that provides computer program instructions for use by the processing unit 140 in the general administration and operation of the image display service 120. The memory 170 may further include computer program instructions and other information for implementing aspects of the present disclosure. For example, in one embodiment, the memory 170 includes a user interface module 172 that generates user interfaces (and/or instructions therefor) for display upon a computing device, e.g., via a navigation interface such as a browser or application installed on the computing device. In addition, memory 170 may include or communicate with an auxiliary image data repository 130, component data repository 134 and/or one or more other data stores, as discussed above with reference to FIG. 1A.

In addition to the user interface module 172, the memory 170 may include an initial configuration generator 122, a user input component 124 and a dynamic updating component 126 that may be executed by the processing unit 140. In one embodiment, the initial configuration generator 122, user input component 124 and dynamic updating component 126 implement various aspects of the present disclosure, e.g., generating an initial configuration for efficient display of images, analyzing user input with respect to the initial configuration, dynamically updating the initial configuration based on the user input, etc., as described further below. While the initial configuration generator 122, user input component 124, dynamic updating component 126 and component modules 176 are shown in FIG. 1B as part of the image display service 120, in other embodiments, all or a portion of an initial configuration generator, a user input component, a dynamic updating component and/or one or more component modules 176 may be implemented by the retail server 110 and/or another computing device. For example, in certain embodiments of the present disclosure, the retail server 110 may include several components that operate similarly to the components illustrated as part of the image display service 120, including a user interface module, initial configuration generator, user input component, dynamic updating component, one or more component modules, processing unit, computer readable medium drive, etc. In such embodiments, the retail server 110 may communicate with an image data store, such as image data store 130, and the image display service 120 may not be needed in certain embodiments. Further, although certain examples are illustrated herein in the context of a retail server 110, this is not a limitation on the systems and methods described herein. It will also be appreciated that, in some embodiments, a user device may implement functionality that is otherwise described herein as being implemented by the elements and/or modules of the image display service 120. For example, the user computing device 102 may receive code modules or other instructions from the retailer server 110 and/or image display service 120 via the network 108 that are executed by the user computing device 102 to implement various aspects of the present disclosure.

Figure 2A:
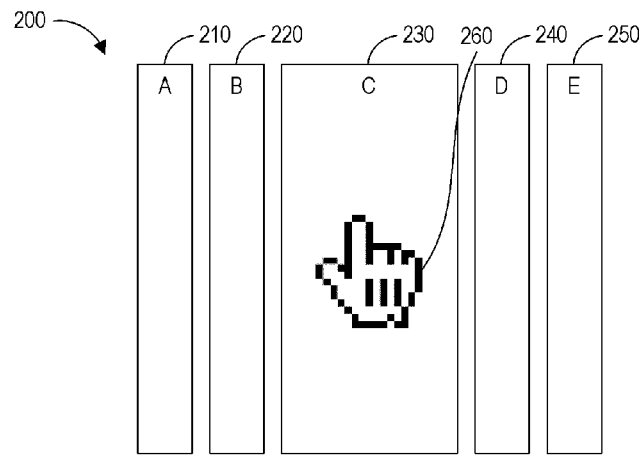
FIGS. 2A-2E illustrate one example of a sequence of partial user interface representations illustrating changing image sizes during interaction of a user with an interactive configuration of item images, according to one embodiment.

FIGS. 2A-2E illustrate one example of a sequence of partial user interface representations illustrating changing image sizes during interaction of a user with an efficient and interactive configuration 200 of item images. Each of the illustrated item images A-E can depict a different item, for example, items available in an electronic catalog. Each of item images A-E can further be associated with different underlying images or versions, for example, allowing each of images A-E to be displayed as either a slice or a full-sized image in the configuration 200 in response to user input. The image configuration 200 includes item image A 210, item image B 220, item image C 230, item image D 240, item image E 250 and cursor 260. Although FIG. 2A depicts an initial configuration with item images A 210, B 220, D 240, and E 250 presented as interactive slices and item image C 230 presented as a full sized image, in some embodiments other arrangements of slices and full sized images can be possible. For example, all images in an interactive image configuration, according to one embodiment, may initially be presented as interactive slices, and in another embodiment, may initially be presented as full sized images. Accordingly, various methods of dynamically updating the initial configuration can apply different parameters for maintaining a portion of the initial configuration in an unchanged state as interacted-with slices are expanded and contracted.

In the illustrated embodiment, cursor 260 represents a location of a cursor controlled by a mouse, joystick, touch event, stylus, or other user input device or process. In some embodiments, no visible cursor may be displayed, such as in a user interface presented for display by a device having touch-sensitive display technologies. A cursor position (for example, a point coordinate) may be defined with respect to pixel positions or item image positions within the image configuration 200. In some embodiments that present for display tall thin vertical slices as illustrated, within the vertical boundary of the image configuration 200, only horizontal motion of the cursor/cursor position 260 may be tracked, received, requested, or considered by the user input component 124 of the image display service 120 of FIGS. 1A and 1B. For example, even though a user's cursor movement or touch movement within the initial configuration may include movement along both the x-axis and y-axis, the image display service 120 may only consider the portions of the movement along the x axis when updating the image configuration. In one embodiment, user input component 124 may follow, track, or log the movement and/or location of the user input. In another embodiment, user input component 124 can receive an indication of the movement and/or location of the user input from another module, for example, input/output device interface 155 of FIG. 1B.

As illustrated in FIG. 2A, an initial configuration of the image configuration 200 presents an interactive slice for item images A 210, B 220, D 240, and E 250 and a full sized image for item image C 230, over which the cursor 260 is centered. This setup can be generated by initial configuration generator 122 illustrated in FIGS. 1A and 1B, according to one embodiment. For example, the configuration 200 may be presented in a portion of a page or user interface that presents items, where each image A-E is a digital photograph or rendered representation of a different item. The configuration 200 can be presented in response to a user request to view a collection of items, such as a search or browse request or a request to view a user-generated collection. The configuration 200 may respond to cursor or touch movement when the cursor or touch location is within a corresponding configuration portion of the user interface. The user interface may also include other portions such as a filter option portion that allows a user to filter the items depicted in the configuration 200 or a visual bookmarking portion that allows a user to maintain a set of item images locked in full-size presentation.

Figure 2B:
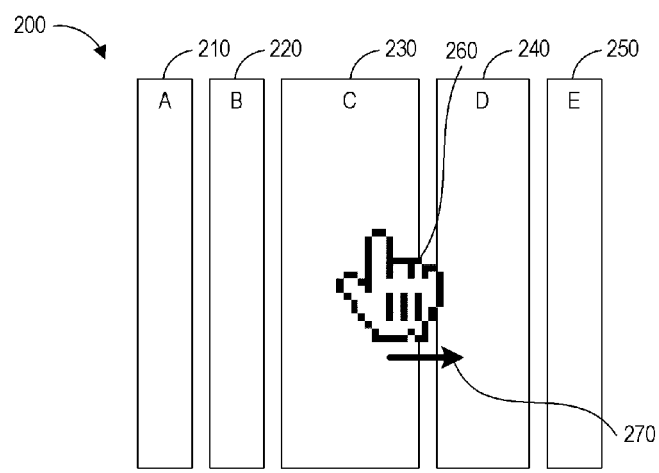

As illustrated in FIG. 2B, the cursor 260 experiences rightward-motion 270 with respect to the initial configuration 200 due to user input, such as an indication of mouse movement or other movement received from input device 165. The rightward-motion 270 can be detected by the user input component 124. Based upon the detection of the rightward-motion 270 and/or a current cursor position, the presentation of item image C 230, away from which the cursor position is moving, can be horizontally contracted from the full size presentation toward the slice presentation and the presentation of item image D 240, toward which the cursor position 260 is moving, can be horizontally expanded from the slice presentation toward the full size presentation. This can be accomplished by dynamic update component 126. As illustrated, item images A 210, B 220 and E 250 remain unchanged from the initial configuration during rightward-motion 270 of the cursor 260. Accordingly, in the illustrated embodiment, only the presentation of a currently selected interactive slice (as illustrated, the presentation of item image 230) and one adjacent interactive slice (here, the presentation of item image 240) are dynamically updated in response to the user input.

Figure 2C:
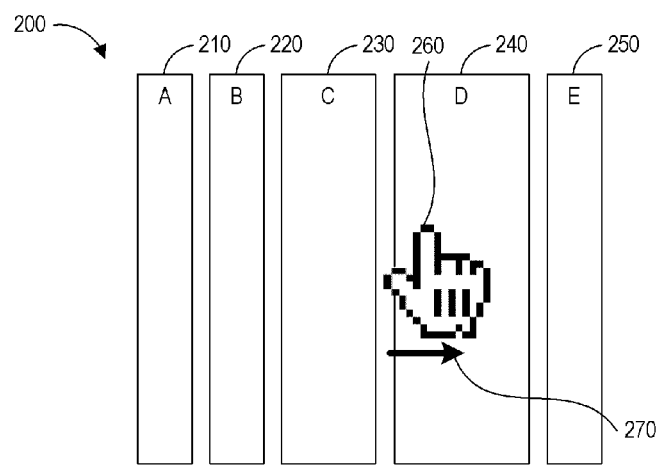

As illustrated in FIG. 2C, continued rightward-motion 270 of the cursor 260 over item image D 240 causes further contraction of the presentation of item image C 230 and further expansion of item image D 240.

Figure 2D:
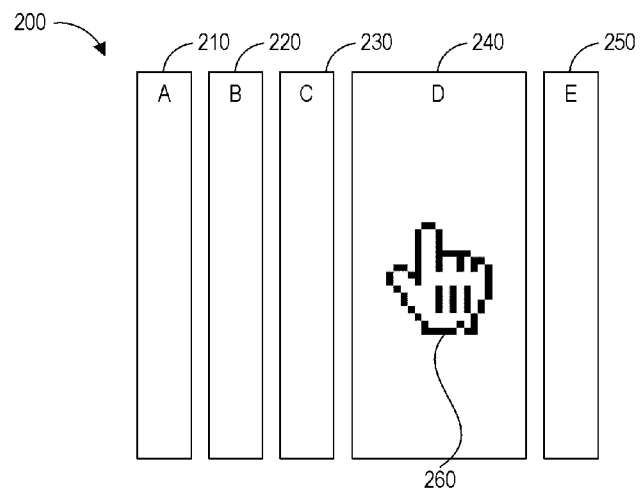

As illustrated in FIG. 2D, the cursor 260 is positioned over the center of item image D 240. Accordingly, the presentation of item image D 240 is updated to reflect the full width image, and the presentation of item image C 230 has been fully contracted to reflect the interactive slice corresponding to item image C 230.

Figure 2E:
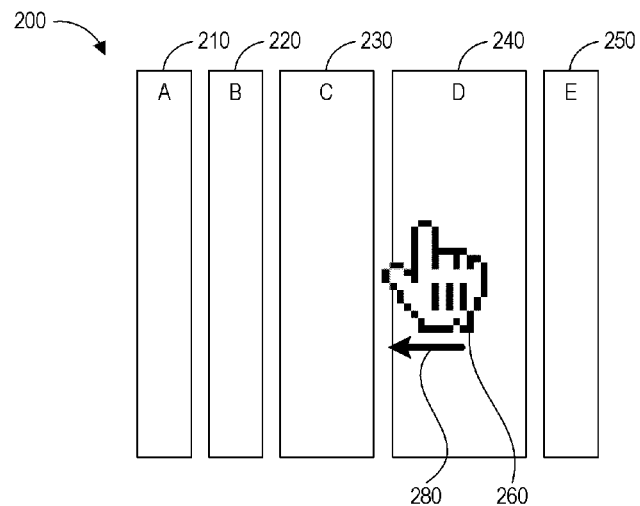

As illustrated in FIG. 2E, leftward-motion 280 of the cursor 260 away from the center of the presentation of item image D 240 causes contraction of the presentation of item image D 240 as well as expansion of the presentation of item image C 230. In one embodiment, a speed, velocity, or pressure of the user input can change the rate at which an interactive slice or slices are expanded or contracted. In some embodiments, instead of a gradual change, any expanding or contracting item images can snap or instantly transition between full size presentation and slice presentation. Though not illustrated, any of the full size image presentations or slice image presentations can be user-selectable, according to some embodiments. For example, user selection of an item image may cause presentation of an item detail page providing information about the depicted item. In addition, as discussed in more detail below with respect to FIG. 6, aspects of the present disclosure may enable a user to visually lock the position and/or size of an item image in the presentation for visual bookmarking purposes.

Some embodiments of the image display service 120 may generate an initial configuration and generate dynamic updates to the initial configuration, as described herein (such as described with respect to FIGS. 2B-2E), in response to detecting or receiving an indication of user input relative to the initial configuration. Data representing each initial configuration and each dynamic update can be sent to a user device 102 for rendering and display to a user. Other embodiments of the image display service 120 can generate the initial configuration and instructions for dynamic updates to the initial configuration, and can send data representing the initial configuration and the dynamic update instructions to a user device 102. Accordingly, a browser or application executed by user device 102 can receive the data, generate and present the initial configuration, and dynamically update the initial configuration according to the received instructions in response to detecting or receiving an indication of user input relative to the initial configuration. In still other embodiments, the initial configuration and updates may be generated by the user computing device 102. For example, an application or browser may generate the configuration for presentation based on images and/or instructions received from the retail server 110 (such as by the retail server sending a page that includes code or script that is executed in a browser environment by the user computing device in order to generate a dynamically responsive image configuration, as described herein). As will be appreciated, FIGS. 2A-2E may represent snapshots or discrete moments in a gradual animation or other gradual visual change between slices and full-sized images.

Figure 3A:
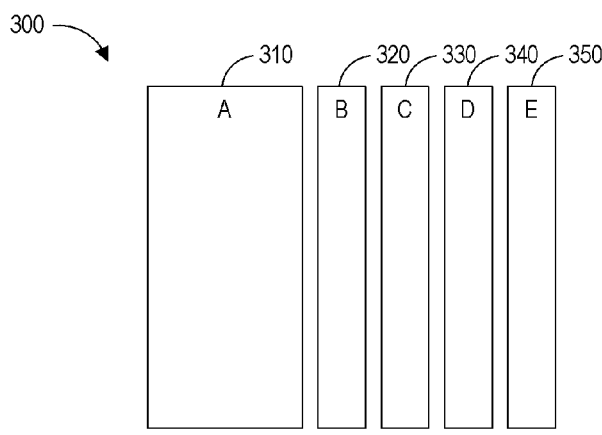
FIGS. 3A-C illustrate another example of a sequence of partial user interface representations illustrating changing image sizes during interaction of a user with an interactive configuration of item images, according to one embodiment.
Figure 3A:
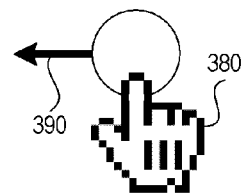
Figure 3B:
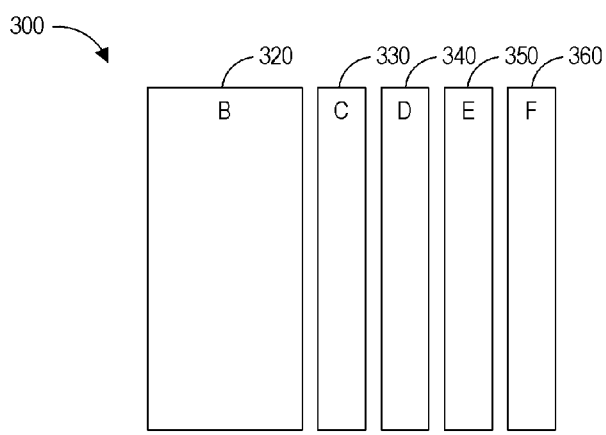
Figure 3B:
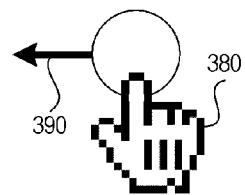
Figure 3C:
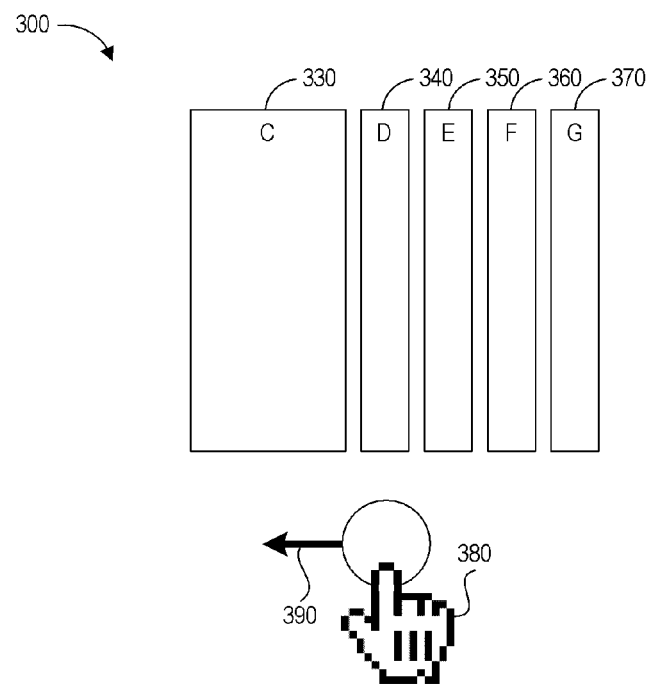

FIGS. 3A-C illustrate another example of a sequence of partial user interface representations illustrating changing image sizes during interaction of a user with an interactive carousel of item images 300. The initial configuration of image carousel 300 as illustrated in FIG. 3A includes item image A 310, item image B 320, item image C 330, item image D 340, item image E 350 and touch input instrument 380 that provides a touch event for user input 390. Touch input instrument 380 can be a finger, stylus, or combination of fingers for a multitouch gesture in some embodiments. An indication of the user input 390 can be detected or received by the user input component 124. Though discussed as implemented by a device equipped with touch-sensitive technology, other embodiments can be implemented in systems responding to other types of user input, such as mouse clicks, key presses, input wheel rotation, etc. Further, although left-most item image A 310 is depicted as having a full sized image presentation while the other images are depicted as having slice presentations, in other embodiments, a different item image (such as the center image C 330 or right image E 325) can be presented in full size. In some embodiments, item images adjacent to the full size image can be presented in an intermediate state between full size and slice size. This initial configuration may be generated by initial configuration generator 122.

As illustrated in FIG. 3B, a first touch detected in the user input 390 (for example, a touch even such as a swipe, tap, or multitouch gesture) causes a transition of item image B 320 into the full size image slot. This transition can involve a gradual shift in the presentation of item image B 320 from slice presentation toward full size presentation. Each of the other item images can be shifted one image slot over to the left, remaining in slice presentation, and new item image F 360 can be displayed in the right-most image slot. This can be accomplished by dynamic update component 126. Item image A 310 may, for example, be visually removed from the configuration by fading to the content of image B, decreasing in size and moving to the left until no longer visible, and/or be otherwise removed from the configuration using any of a variety of animations or visual effects.

As illustrated in FIG. 3C, a second touch event detected in the user input 390, for example, a second swipe, transitions item image C 330 into the full size image slot. This transition can involve a gradual shift in the presentation of item image C 330 from slice presentation toward full size presentation. Each of the other item images can be shifted one image slot over to the left, remaining in slice presentation, and new item image G 370 can be displayed in the right-most image slot. This image movement or shifting can be continued as any additional user input is received, such as by shifting item images both left and right between the image slots available in the image configuration 300, based on detected or received indications of user input.

Figure 4A:
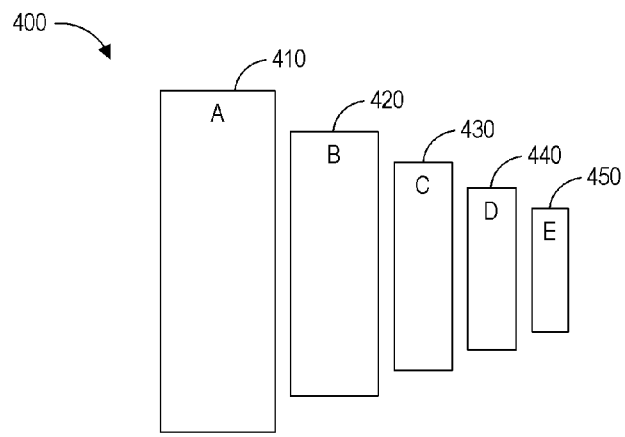
FIGS. 4A-B illustrate another example of a sequence of partial user interface representations illustrating changing image sizes during interaction of a user with an interactive configuration of item images, according to one embodiment.
Figure 4A:
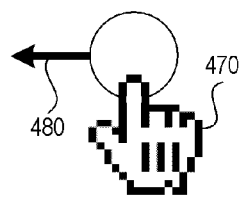
Figure 4B:
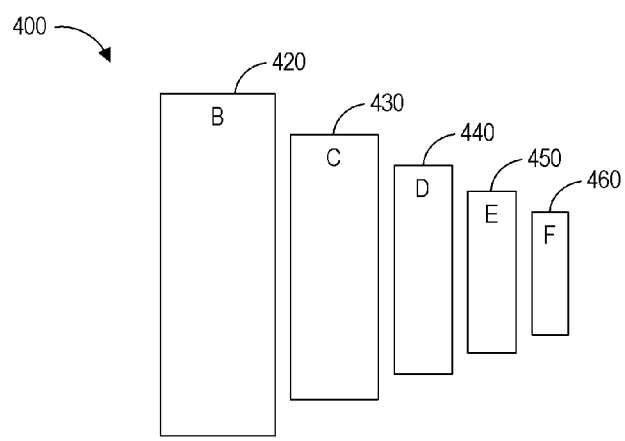
Figure 4B:
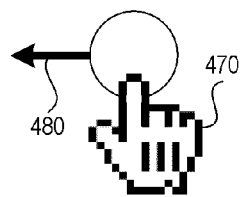

FIGS. 4A-B illustrate another example of a sequence of partial user interface representations illustrating changing image sizes during interaction of a user with an interactive configuration of item images 400. The initial configuration of the item configuration as illustrated in FIG. 4A includes a number of image slots in a perspective arrangement, with the left-most image slot corresponding to a full size image. In other embodiments, other image slots may correspond to the full size image presentation. For example, a center image slot may correspond to a full size image with mirrored perspective adjacent slices, or a right image slot may correspond to the full size image. The image configuration illustrated in FIG. 4A includes item image A 410 presented in full size, item images B 420, C 430, D 440, and E 450 presented in perspective and in slice size, and touch input instrument 470 displayed over touch event 480. Touch input instrument 470 can be a finger, stylus, or combination of fingers for a multitouch gesture in some embodiments. An indication of the touch event 480 can be detected or received by the user input component 124. Though discussed as implemented in a device equipped with touch-sensitive technology, other embodiments can be implemented in systems responding to other types of user input such as mouse clicks, key presses, input wheel rotation, etc.

As illustrated in FIG. 4B, the touch event 480, such as a swipe, tap, or multitouch gesture, transitions item image B 420 into the full size image slot. This transition can involve a gradual shift in the presentation of item image B 420 from slice presentation toward full size presentation as well as a gradual scaling of item image B 420 toward the height of the perspective position shown in the full size image slot. Each of the other item images can be shifted one image slot over to the left, remaining in slice presentation and scaled according to the perspective position of the new image slot, and new item image F 460 can be displayed in the right-most image slot. This can be accomplished by dynamic update component 126.

Figure 5:
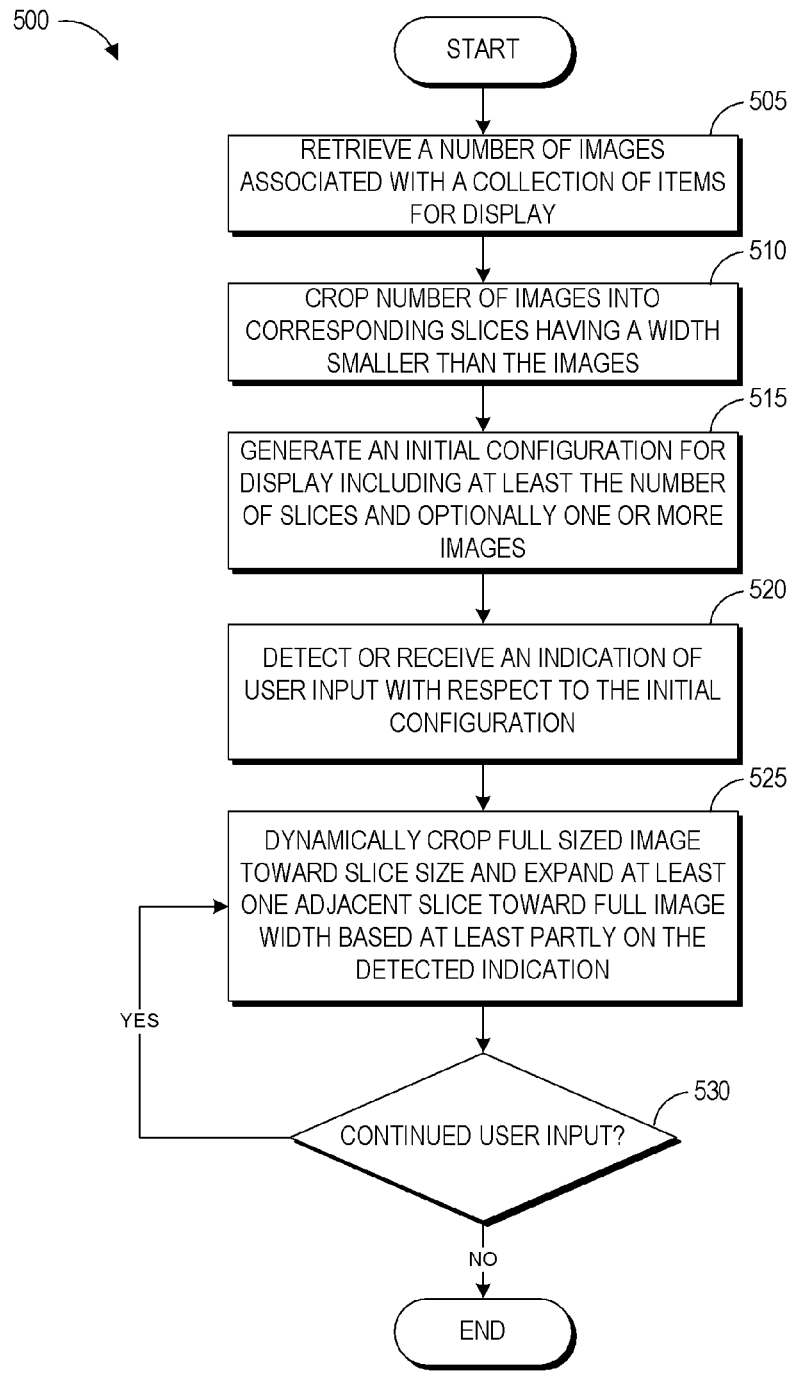
FIG. 5 is a flow diagram of an illustrative method implemented at least in part by an image display service for generating a page or user interface that includes an interactive configuration of item images.

FIG. 5 is a flow diagram of an illustrative method 500 implemented at least in part by the image display service 120 for generating a page or user interface that includes an interactive configuration of item images. While the illustrative method will be described below as being implemented by the components of image display service 120, in other embodiments, a similar method may be implemented by the retail server 110 or other computing system responsible for providing front-end communication with a user computing device. As discussed above, illustrative method 500 may be implemented entirely by a user device, such as user computing device 102, in some embodiments. While a page is used as an example below, the illustrative method 500 may, in other embodiments, include generating a user interface or displayable file other than a page.

The illustrative method 500 begins at block 505, where the initial configuration generator 122 retrieves a number of images associated with a collection of items for display, such as by retrieving the images from image data repository 130. This can occur, for example, when image display service receives a page request from a user device, such as computing device 102. Alternatively, the image display service may receive a request for a page or part of a page to be generated from the retail server 110.

At block 510, the initial configuration generator 122 crops the thumbnails into slices having a smaller width than the images. This can be done, for example, by determining a horizontal center line (or a midpoint of the image along the image's x-axis) of each image and horizontally and symmetrically cropping the image from the left and right edges toward the center point. In one embodiment, the initial configuration generator 122 may not crop the images, and may instead retrieve pre-cropped images from image data repository 130. In yet another embodiment, the initial configuration generator 122 may not crop the images, but rather may arrange the images in the background of a masking layer having slice-sized viewports or windows and may dynamically mask portions of the images by adjusting the size of the windows in the masking layer. In some embodiments, the center of each image, or of the item depicted in the image, can be aligned with the center of a corresponding window. The window size can then be gradually adjusted to mask more or less of the underlying image with the masking layer based on user interaction with the initial configuration. For example, a width and/or height of the window can be expanded or contracted from one side. In another example, the width and/or height can be expanded or contracted symmetrically from two sides. Accordingly, as described above, the term "crop" can refer to removing image data from one or more sides of an image or to masking the image in the background of a masking layer having a window, depending on the embodiment.

While generating the cropped images is illustrated as being done prior to generating the initial configuration of images, it will be appreciated that, in some embodiments, the images may be cropped as the initial configuration is generated. For example, the image arrangement and image sizing of the initial configuration may be generated and the images to be included then be dynamically cropped to fit this arrangement. To illustrate, in one embodiment, a slice size may be determined based on a determination of how many item images to display on a page having a certain width (or height). In another embodiment, slice size may be determined based on a minimum number of pixels that can be used to convey characteristics of the depicted item to a user, for example, between around 5 to around 50 pixels. In yet another embodiment, slice size may be determined based on a percentage width (or height) of the full-sized image, for example, between around 5% to around 50%. Slice size may also be determined at least partly based on the width or height of the actual item depiction in the image in order to display a percentage of the item, for example, the middle 50% of a dress item. Accordingly, the slice may be centered on the item and this can be different from the center of the overall image in some scenarios. A slice center can be a point defined by an automated image analysis or by input by a user or administrator of the system. Images in a configuration can be cropped and scaled in one embodiment to display similar item views in each slice.

At block 515, the initial configuration generator 122 generates an initial configuration including the slices and optionally including at least one full-sized image arranged in various positions within the page. A given image's position within the page may be identified in various manners depending on the embodiment, the page layout, stored settings and/or other information. For example, if the page includes multiple rows or sections of content that each includes multiple item images, each image's position may be uniquely identified by providing information identifying the section and the position within the section that the given item appears. In other embodiments, the page may include various discrete windows, portions, areas or spaces in which a single image may be included, such that a name or other identification information assigned to the given window, portion, area or space may be sufficient to uniquely identify an item's position within the page. In other embodiments, an image's position may be identified based at least in part on line numbers, row and/or column numbers, x-y coordinates (e.g., pixel coordinates within the generated page), frame names or numbers, section names or numbers (e.g., "sidebar" representing that the item appeared within a side navigation bar of the page), relative to other content of the page (e.g., information identifying that the item appeared below, above, within, over or between other identified content) and/or based on other information.

The initial configuration generator 122 can also generate selectable options for interactivity with the slices by user input. For example, one or more component modules 180 may each select one or more slices or thumbnails to include as associated selectable options in one or more portions or sections of the page. The selectable options can include selectable options to request item detail pages and/or options to visually bookmark an item image, in some embodiments. This initial display can be generated by the image display service 120, or can be sent to a user device 102 for rendering by a browser, application, or other locally-operated client.

Next, at block 520, the user input component 124 may detect or receive an indication of user input with respect to the initial configuration. As discussed above, the user input can be a single or multitouch gesture, mouse click, key press, input wheel rotation, voice command, gesture, or any other input command. In one embodiment, user input component 124 may follow, track, or log the movement and/or location of the user input. In another embodiment, user input component 124 can receive an indication of the movement and/or location of the user input from another module, for example, input/output device interface 155. The user input can be represented as a coordinate, motion vector, or association with an item image in the initial configuration. The user input may be provided using an input device connected to a computing system remote from user input component 120 of service 120, for example, an input device connected to a user device 102. Accordingly, the location and/or movement of the user input can be detected by the user device 102 and sent to the service 120 in one embodiment. In another embodiment, the user device 102 can both detect the location and/or movement of the user input and contain the functionality of the user input component 124 and dynamic update component 126, such as in code sent by the service 120 with the initial page.

User input component 124 can also identify a set of interacted-with images based on the indication of user input and a predetermined distance. For example, a primary interacted-with image can be the image sharing a region in which user input was detected. In some embodiments, one or both images adjacent to the primary interacted-with image can be included in the set of interacted-with images based on the predetermined distance. Some embodiments may further include additional images in the set of interacted-with images based on the predetermined distance.

At block 525, for each image in the set of interacted-with images, the dynamic update module 126 can determine whether to expand or contract the presentation of the image based on the user input. For example, as described above with respect to FIGS. 2A-2E, user input in a direction away from a center line or point of a full sized presentation of an item image can result in contraction of the presentation of that image toward slice size. User input in a direction toward a center line or point of a slice adjacent to the user input location can result in expansion of the presentation of that adjacent slice toward full size. During the dynamic update of the initial configuration, in some embodiments, visual changes may only occur within the portion of the initial configuration corresponding to the set of interacted-with images. Beyond the predetermined distance from the user input location, the initial configuration may remain unchanged. The images that change in response to an indication of movement may be limited, for example, to a predetermined distance that is defined in terms of a certain number of images (such as one image on either side of the image within which the cursor is located), a number of pixels (such as any images that are within 100 pixels of the cursor or full-sized image), a number of inches, a percentage of the configuration's display width, based on the average slice size, based on the average full-width image size, or other basis. Additionally or alternatively, dynamic updating of the initial configuration can involve the image slot shifting and perspective transforms illustrated in FIGS. 3A-3C and 4A-4B, in some embodiments. Further, in some embodiments, dynamic updating of the initial configuration can include locking one or more item images in a full size presentation for visual bookmarking purposes.

In some embodiments, the dynamic updates may be rendered by the image display service 120 or retail server 110 and sent to user device 102. In other embodiments, the dynamic updates may be rendered by a user device 102. For example, instructions relating to dynamic update of the initial configuration may be included in executable code associated with the page such that the executable code, when executed by the user device 102 or other user device, causes the user device 102 to dynamically update the initial configuration based at least part on user input. In some embodiments, the user device 102 may receive from the image display service 120 and locally store information relating to the initial configuration and dynamic update instructions.

At decision block 530, the user input component 124 can determine whether user input continues with respect to the initial configuration. If user input continues, the process 500 can loop back to block 525 to dynamically update the initial configuration based on the user input. If the user input does not continue, such as for a predetermined period of time, the process 500 can pause or end, although it may be reactivated in response to a later movement. In some embodiments, the process 500 ends when the user closes the page.

While FIG. 5 has been described above with reference to an embodiment in which interactive image display configurations are generated and updated by the image display service 120, in other embodiments, all or a portion of an efficient and interactive image display may be generated and/or updated by the computing device 102. For example, executable code included in a page or associated with a user interface may, when executed by the computing device 102, cause the computing device 102 to generate and/or update an efficient and interactive image display. As an example, a script or other executable code may be included in a page sent by the retail server 110 to the computing device 102 for display by a browser or other application executed by the computing device 102. Upon a user selection of a given selectable option within the page, the script or other executable code may cause the computing device 102 to generate and/or update an interactive image display, as described herein.

Figure 6:
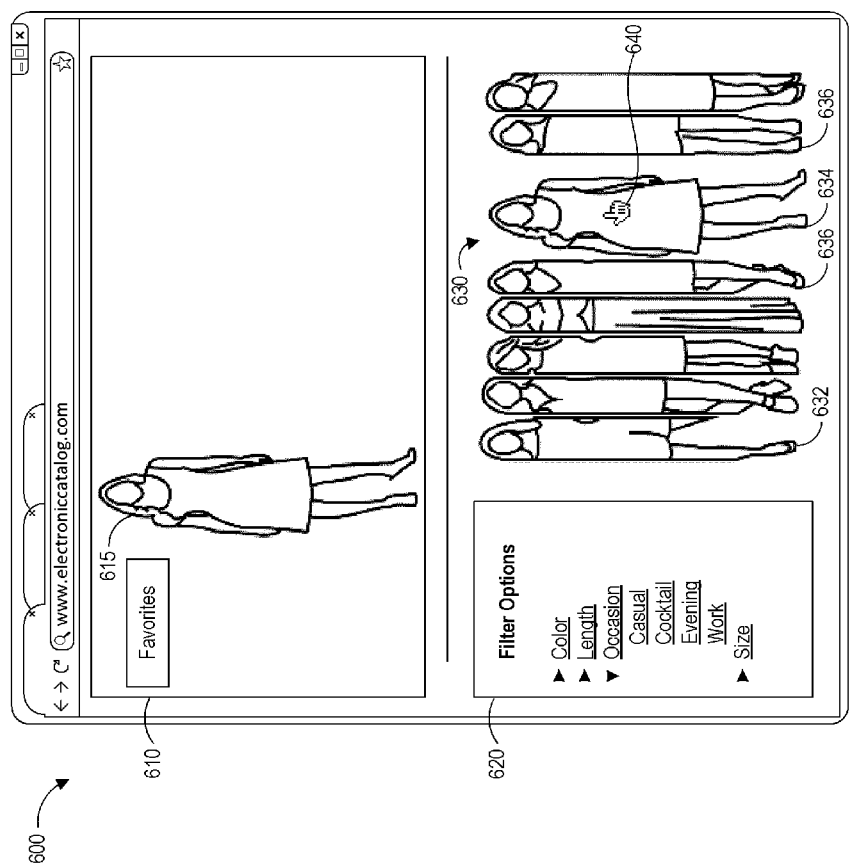
FIG. 6 is an illustrative user interface generated at least in part by an image display service that includes an interactive configuration of item images.

FIG. 6 is an illustrative user interface 600 generated at least in part by the image display service 120 that includes a visual bookmarking section 610, a set of filter options 620 and an efficient configuration of item images 630 depicting a number of dresses. The filter options 620 can be used to reduce a number of items presented in the initial configuration of item images 630. A user interface similar to user interface 600 may be presented in a variety of circumstances, such as when presenting search results to a user or when enabling a user to browse a category of items. Alternatively, any list or collection of items may be presented in a similar manner as illustrated, such as a wish list, electronic shopping cart, collection of items that have been designated as favorites or otherwise marked or tagged by a user, item recommendations, items related to a given brand, author or designer, and/or may other factors. As will be appreciated, the configuration of item images 630 allows a significantly larger number of items to be presented in a relatively limited display width as compared to if full-width images were displayed for every item, while still enabling a user to quickly request to see any image in full. In addition to the large number of items capable of being simultaneously presented for display as slices, the configuration of item images 630 also allows a user to more easily compare differences between the items and to get a sense of the overall item collection or group as a whole.

The efficient configuration of item images 630 can be navigated by a user as described above with respect to FIGS. 2A-2E, 3A-3C, and 4A-4B in various embodiments. For example, a user input as represented by cursor 240 can cause presentation of full size dress image 634, contraction of the presentation of one or both adjacent images toward slice size, and no change to an interactive slice 632 outside of the predetermined distance used to determine a set of interacted-with item images, according to one embodiment.

The visual bookmarking section 610 can include none, one, or more full size dress images 615 locked in the full size presentation based on user selection of the images 615 for visual bookmarking. For example, a user could drag and drop an image from the efficient configuration 630 to the visual bookmarking section in one embodiment. In another embodiment, a user may indicate that an item image should be included in the visual bookmarking section 610 by for example, selecting a bookmarking option presented with the image or slice or by a user movement or gesture associated with such functionality. Although illustrated in a separate portion of the page from the item image configuration 630, in some embodiments, a user may be able to lock an item image in the full sized presentation within the efficient configuration 630. In such embodiments, the visual bookmarking section 610 can optionally be excluded.

Figure 7:
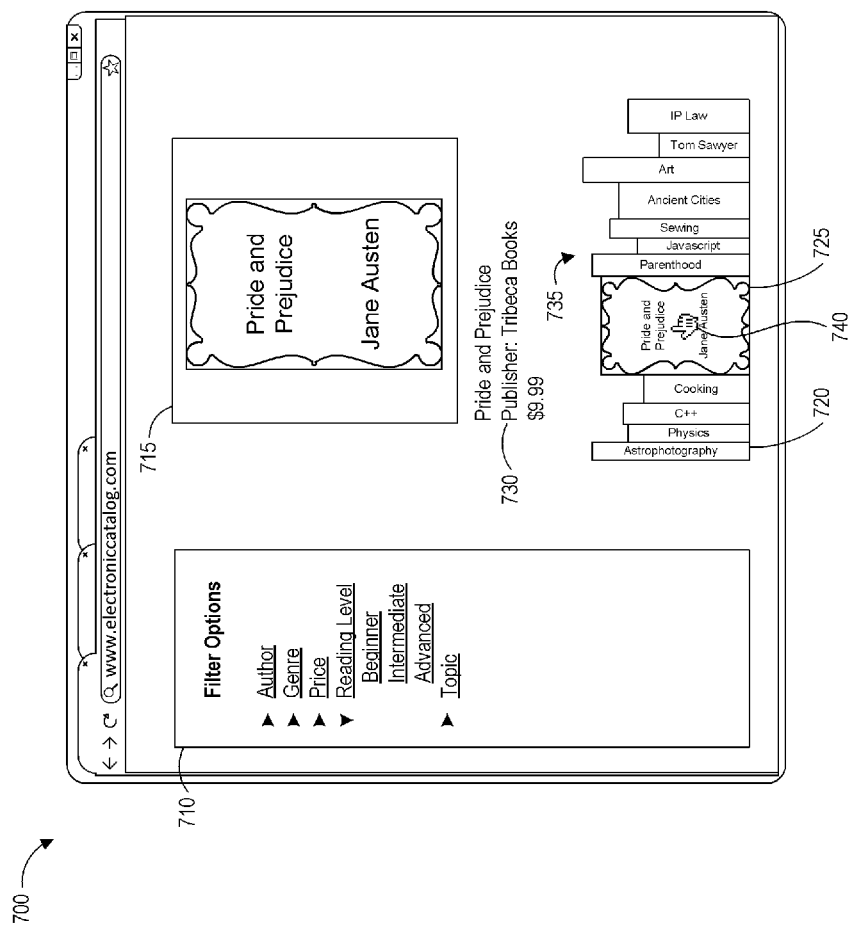
FIG. 7 is an illustrative user interface generated at least in part by an image display service that includes an interactive configuration of item images.

FIG. 7 is an illustrative user interface 700 generated at least in part by the image display service 120 that includes a set of filter options 710, a highlighted item section 715, and an efficient configuration of item images 735 depicting a number of books. The filter options 710 can be used to reduce a number of items presented in the initial configuration of item images 735.

The efficient configuration 735 is illustrated as including a spine view 720 for a number of books on digital display and a cover view 725 for a book corresponding to the location of a user input, represented by cursor 740. As the user moves the cursor 740 along the display of spine views 710, one or more spine views can transition into a cover view 725 based at least partly on the cursor movement or location. In addition to the cover view 725 within the efficient configuration 735, an enlarged cover view can be displayed within highlighted item section 715 together with information 730 regarding the item in order to provide the user with a higher zoom level and therefore a greater level of detail. Accordingly, user interface 700 provides one example of an embodiment in which a method similar to that described above with respect to FIG. 5 may be implemented by switching between two different images of an item in response to user movement, rather than switching between a slice and full-width version of a single underlying image.

Although the images and reduced representations described herein are generally discussed in the context of a two-dimensional display, it will be appreciated that the efficient display implementing dynamic cropping and expanding of image data can be applied to images displayed within a three-dimensional image space as well. For example, some systems may display three-dimensional representations of items or other objects to users on a two-dimensional display. Other systems may display three-dimensional representations of objects using a volumetric display, for example, a stereoscopic, autostereoscopic, or multiscopic display. The data units of the three-dimensional images can be represented by one or more of voxels, polygons, or points within a point-cloud.

Accordingly, rather than contracting or expanding a one-dimensional line forming an edge of a two-dimensional image, the efficient display techniques can be applied to contract or expand a two-dimensional plane forming a boundary of a three-dimensional image or a three-dimensional object depicted in an image. In some embodiments, two planes can be gradually contracted towards a center point for dynamic cropping toward a reduced three-dimensional representation and can be gradually expanded away from the center point for dynamic expansion toward a full sized three-dimensional representation. The center point can lie within a plane located in the middle of the height, width, or depth of a three-dimensional image, or within a plane located in the middle of the height, width, or depth of a three-dimensional object depicted in the three-dimensional image. The planes can be adjacent or parallel. In some embodiments, three-dimensional cropping and expansion can occur radially around the center point rather than by movement of flat planes.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
    an electronic data store configured to store at least a plurality of images associated with a plurality of items; and
    a computing system comprising one or more computing devices, the computing system in communication with the electronic data store and configured to at least:
        retrieve the plurality of images for display, each of the plurality of images associated with an item of the plurality of items;
        generate an initial display configuration for the plurality of images, the initial display configuration including a slice representation of each image of at least a subset of the plurality of images, wherein the slice representation of each image has a width less than a width of the image and is presented for display image data cropped from both sides of the image;
        detect an indication of user input with respect to the initial display configuration, wherein the user input corresponds to a request for expansion of a selected slice representation in the initial display configuration; and
        based at least in part on the detected indication,
            gradually expand the selected slice representation to display an image corresponding to the selected slice; and
            gradually narrow another slice representation located within a predetermined distance from the selected slice representation in the initial display configuration without altering displayed slice representations located further than the predetermined distance from the selected slice representation.

2. The system of claim 1, wherein gradually expanding the selected slice representation comprises maintaining a constant center point of the slice representation during expansion.

3. The system of claim 1, wherein gradually narrowing the other slice representation comprises maintaining a constant center point of the other slice representation during contraction.

4. The system of claim 1, wherein the indication indicates movement of the user input toward the selected slice representation.

5. A system comprising:
    an electronic data store configured to store at least a plurality of images, wherein each image of the plurality of images is associated with an item; and
    a computing system comprising one or more computing devices, the computing system in communication with the electronic data store and configured to at least:
        retrieve the plurality of images for display;
        generate an initial display configuration for the plurality of images, the initial display configuration including a reduced representation of each image of at least a subset of the plurality of images, wherein the reduced representation of each image is generated by cropping image data from a side of the image; and
        based at least in part on a detected indication of movement of a user input in the direction of a selected reduced representation in the initial display configuration,
            gradually expand the selected reduced representation to display an image corresponding to the selected reduced representation without altering displayed reduced representations located further than a predetermined distance from the selected reduced representation; and
            gradually narrow another reduced representation located within the predetermined distance from the selected reduced representation in the initial display configuration.

6. The system of claim 5, wherein gradually expanding the selected reduced representation occurs while gradually narrowing the other reduced representation.

7. The system of claim 5, wherein the other reduced representation is a reduced representation adjacent to the selected reduced representation.

8. The system of claim 7, wherein the adjacent reduced representation is adjacent to a side of the selected reduced representation corresponding to a direction of motion indicated by the user input.

9. The system of claim 5, wherein cropping image data comprises cropping image data from two opposing sides of the image toward a center point of the image.

10. The system of claim 9, wherein the center point is determined based at least in part on an object center point of an object depicted in the image.

11. The system of claim 9, wherein cropping image data from two opposing sides of the image toward the center point of the image comprises at least one of vertically cropping the image data from the two opposing sides of the image, or horizontally cropping the image data from the two opposing sides of the image.

12. The system of claim 5, wherein cropping image data from a side of the image comprises masking an outer portion of the side of the image.

13. A computer-implemented method comprising:
as implemented by one or more computing devices configured with specific executable instructions,
generating an initial display configuration for a plurality of images, the initial display configuration including a reduced representation of each image of at least a subset of the plurality of images, wherein the reduced representation of each image is generated by masking image data from a side of the image using a masking layer; and
updating the initial display configuration based at least in part on an indication of user input, wherein updating the initial display configuration comprises:
gradually expanding a window in the masking layer of a selected reduced representation to display an image corresponding to the selected reduced representation without altering displayed reduced representations located further than a predetermined distance from the selected reduced representation; and
gradually narrowing a window in the masking layer of another reduced representation located within the predetermined distance from the selected reduced representation in the initial display configuration.

14. The computer-implemented method of claim 13, further comprising detecting an indication of user input, wherein the user input corresponds to a request for expansion of the window in the masking layer of the selected reduced representation in the initial display configuration.

15. The computer-implemented method of claim 13, wherein gradually expanding the window in the masking layer of the selected reduced representation occurs while gradually narrowing the window in the masking layer of the other reduced representation.

16. The computer-implemented method of claim 13, wherein each image of the plurality of images is associated with an item in an electronic catalog.

17. The computer-implemented method of claim 16, wherein at least one item in the electronic catalog is a product and the image associated with the item is a photograph of the product.

18. The computer-implemented method of claim 13, wherein the indication of user input is associated with at least one of a touch, a gesture or a cursor movement.

19. A computer-readable, non-transitory storage medium storing computer executable instructions that, when executed by one or more computing devices, configure the one or more computing devices to perform operations comprising:
generating an initial display configuration for a plurality of images, the initial display configuration including a reduced representation of each image of at least a subset of the plurality of images, wherein the reduced representation of each image is a cropped portion of the image generated to have a determined center point; and
updating the initial display configuration based at least in part on an indication of user input, wherein updating the initial display configuration comprises:
gradually expanding a selected reduced representation to display an image corresponding to the selected reduced representation without altering displayed reduced representations located further than a predetermined distance from the selected reduced representation; and
gradually narrowing another reduced representation.

20. The computer-readable, non-transitory storage medium of claim 19, wherein the instructions further configure the one or more computing devices to generate the reduced representation of each image by at least one of removing an outer portion from a side of each image, or masking the outer portion from a side of each image using a masking layer.

21. The computer-readable, non-transitory storage medium of claim 19, wherein the determined center point corresponds to a center point of the image.

22. The computer-readable, non-transitory storage medium of claim 19, wherein the determined center point corresponds to a center point of an object depicted in the image.

23. The computer-readable, non-transitory storage medium of claim 19, wherein the determined center point lies within a plane located in the middle of the height, width, or depth of a three-dimensional image.

24. The computer-readable, non-transitory storage medium of claim 19, wherein the determined center point lies within a plane located in the middle of the height, width, or depth of a three-dimensional object depicted in a three-dimensional image.

25. The computer-readable, non-transitory storage medium of claim 19, wherein the predetermined distance corresponds to a width of a reduced representation on a side of the selected reduced representation.

26. The computer-readable, non-transitory storage medium of claim 19, wherein the predetermined distance corresponds to a percentage of the width of the initial display configuration.

\* \* \* \* \*